United States Patent
Horie (10) Patent No.: US 8,259,811 B2
(45) Date of Patent: Sep. 4, 2012

(54) METHOD FOR DETERMINING A NUMBER OF ITEMS OF ENCODED DATA THAT CAN BE STORED IN A MEMORY, AND METHOD FOR CONTROLLING SIZES OF ITEMS OF ENCODED IMAGE DATA TO BE STORED IN A MEMORY

(75) Inventor: Kenichi Horie, Machida (JP)

(73) Assignee: Olympus Imaging Corp, Tokyo (JP)

( * ) Notice: Subject to any disclaimer, the term of this patent is extended or adjusted under 35 U.S.C. 154(b) by 1230 days.

(21) Appl. No.: 11/947,936

(22) Filed: Nov. 30, 2007

(65) Prior Publication Data

US 2009/0141795 A1 Jun. 4, 2009

(51) Int. Cl.
*H04N 7/12* (2006.01)

(52) U.S. Cl. ............... 375/240.23; 375/240; 375/240.24

(58) Field of Classification Search .................. 375/240, 375/240.03, 240.13, 240.16, 240.23, 240.24, 375/240.25, 240.26
See application file for complete search history.

(56) References Cited

U.S. PATENT DOCUMENTS

| | | | |
|---|---|---|---|
| 5,146,324 A | | 9/1992 | Miller et al. |
| 5,956,426 A | * | 9/1999 | Matsuura et al. ............. 382/239 |
| 2001/0000969 A1 | * | 5/2001 | Ohta et al. .................... 348/231 |
| 2001/0032335 A1 | * | 10/2001 | Jones ............................ 725/105 |
| 2002/0194351 A1 | * | 12/2002 | Nishimura et al. ........... 709/229 |
| 2004/0264580 A1 | * | 12/2004 | Chiang Wei Yin et al. .................. 375/240.25 |
| 2005/0249279 A1 | * | 11/2005 | Kondo et al. ............ 375/240.03 |
| 2007/0065023 A1 | * | 3/2007 | Lee et al. ...................... 382/232 |
| 2007/0098084 A1 | * | 5/2007 | Kubota et al. ............ 375/240.26 |
| 2008/0063059 A1 | * | 3/2008 | Abe et al. .................. 375/240.13 |
| 2008/0063069 A1 | * | 3/2008 | Sekiguchi et al. ........ 375/240.16 |
| 2008/0095454 A1 | * | 4/2008 | Wu et al. ....................... 382/246 |

FOREIGN PATENT DOCUMENTS

| | | |
|---|---|---|
| JP | 02-100487 A | 4/1990 |
| JP | 05-110789 A | 4/1993 |

* cited by examiner

*Primary Examiner* — Pao Sinkantarakorn
*Assistant Examiner* — Ajay Cattungal
(74) *Attorney, Agent, or Firm* — Holtz, Holtz, Goodman & Chick, PC (57) ABSTRACT

Methods are provided for an apparatus which encodes items of data by variable-length coding and which stores the encoded items of data in a memory, wherein a size of one of the items of encoded data is variable by varying a value of a control parameter of the variable-length coding. One method includes: determining an amount of available memory space in the memory; determining a value of the control parameter for the variable-length coding of the items of data; and determining a number of items of encoded data that can be stored in the available memory space, based on an upper limit of the size of one of the items of encoded data at the determined value of the control parameter.

20 Claims, 6 Drawing Sheets

METHOD FOR DETERMINING A NUMBER OF ITEMS OF ENCODED DATA THAT CAN BE STORED IN A MEMORY, AND METHOD FOR CONTROLLING SIZES OF ITEMS OF ENCODED IMAGE DATA TO BE STORED IN A MEMORY

BACKGROUND OF THE INVENTION

1. Field of the Invention

The present invention relates to a method for determining the amount of encoded data that can be stored in a known memory space, that is, in a memory space having a known storage capacity, as well as to a method for controlling the size of encoded data.

2. Description of the Related Art

JPEG is a common method for encoding still images and is specified in ISO 10918-1 JPEG International Standard/ITU-T Recommendation T.81 ("Digital Compression Coding of Continuous-Tone Still Images"), which is incorporated by reference herein. This reference is hereinafter referred to as the "JPEG specification". This standard is reproduced in Pennebaker and Mitchell, JPEG: Still Image Data Compression Standard, New York, Van Nostrand Reinhold, 1993, which is also incorporated by reference herein.

Most digital still cameras employ the so-called JPEG Baseline Coding technique, in which a still image is partitioned into 8×8 blocks, each of which is transformed into the frequency domain by DCT (Discrete Cosine Transform), quantized, and variable-length encoded using Huffman codes.

In a digital camera employing JPEG Baseline Coding, it is difficult to predict the remaining number of photographs that can be recorded in a given memory space due to the unpredictable file sizes of the image files derived from the photographs. Some cameras display a number that indicates a remaining number of images that can be recorded in a remaining memory space, and control the file sizes of subsequently obtained images, so that the displayed number of JPEG images can be stored in the remaining memory space. A well-known method for controlling the file size of a variable-length coded image is the iterative optimization of the quantization tables. A software implementation of this method is disclosed in Japanese laid open patent application No. H02-100487, whereas a purely hardware implementation of this method using multiple bit-counting sections is disclosed in U.S. Pat. No. 5,146,324. Both the software and hardware implementations require extensive processing time and consume excessive battery power.

It has also been suggested to calculate and display the remaining number of photographs that can be obtained with a digital still camera based upon statistical models of the file size variation as described in US2001/0000969A1 or in Japanese laid open patent application No. H05-110789. These methods rely on the average file size and its statistical variation only, and thus are not considerably reliable.

SUMMARY OF THE INVENTION

Given a variable-length method of encoding digital data into encoded files which has a control parameter allowing file size (or rate) control, the present invention provides a reliable method of predicting the number of items of encoded data that can be recorded in a given memory space that takes into account the pre-selected control parameter, and the present invention provides an easy and non-iterative or semi-iterative (meaning only one trial) method of controlling the file size of encoded data in order to record a given number of items of the encoded data in a given memory space.

In particular, the present invention is provided in the context of transform-coding, which is defined here to mean an encoding method in which input data to be encoded is transformed using some transformation mapping, and in which the transformed data is quantized using quantization factors and then variable-length encoded, wherein the quantization factors can be adjusted to control the size or rate of the encoded data. Input data need not necessarily be raw data, but may be any pre-processed data. In particular, difference data between blocks belonging to different frames within a movie may such an input data. Further, the invention is also directed to software, hardware, and networked implementations of the prediction and control methods and, finally, to a digital camera implementing at least one of these methods.

According to the present invention, a function is employed that represents the theoretical upper limit of the size (or length) of the encoded data (or file), which is dependent on the control parameter allowing control of the file size. As used here, theoretical (or mathematical) upper limit means an upper limit of the file size that cannot be exceeded by any file size with absolute certainty. By knowing this function, the number of files recordable at a given value of the control parameter is trivially given by the largest integer not exceeding the quotient of the memory space by the value of this function for the given control parameter. Alternatively, the knowledge of this function can be combined with statistical prediction methods employing, e.g., the average file size and its variations, to furnish an advanced prediction method with reliability not possible with prior art statistical methods.

It is also advantageous to control the file size of an encoded file using the inverse function, which enables that the encoded file to have a file size that is below a given limit with certainty. If the encoded file size is found too be small, the control parameter can be adjusted by using standard prediction curves (for example, the file size versus control parameter) once in order to achieve the desired file size below the given limit.

According to one aspect of the present invention, a method is provided for an apparatus which encodes items of data by variable-length coding and which stores the encoded items of data in a memory, wherein a size of one of the items of encoded data is variable by varying a value of a control parameter of the variable-length coding. The method includes: determining an amount of available memory space in the memory; determining a value of the control parameter for the variable-length coding of the items of data; and determining a number of items of encoded data that can be stored in the available memory space, based on an upper limit of the size of one of the items of encoded data at the determined value of the control parameter.

According to another aspect of the present invention, a method is provided for an apparatus which encodes items of data by variable-length coding and which stores the encoded items of data in a memory, wherein a size of one of the items of encoded data is variable by varying a value of a control parameter of the variable-length coding. The method includes determining an amount of available memory space in the memory; determining a number of items of encoded data to be stored in the available memory space; and adjusting a size of the each of the items of encoded data to be stored in the available memory space based on an upper limit of the size of one of the items of encoded data at the set value of the control parameter.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein.

DETAILED DESCRIPTION

A JPEG file may be formatted in the JFIF as defined in "JPEG File Interchange Format Version 1.02 Sep. 1, 1992 C-Cube Microsystems" or in the JPEG compressed version of Exif (Exchangeable image format) described in "Digital Still Camera Image File Format Proposal (Exif) Version 1.0 Mar. 24, 1995 JEIDA/Electronic Still Camera Working Group" or in the SPIFF format, defined in "ITU-T Rec. T.84, Annex F-Still Picture Interchange File Format, 1995", all of which are incorporated herein by reference in their entireties.

According to one embodiment of the present invention described below, a method for predicting the number of items of encoded data that can be recorded in a given amount of memory space is applied to a digital camera that performs JPEG Baseline coding of still images in the JFIF format or Exif format.

In JPEG Baseline coding, a (color) image includes, for example, one luminance (Y) and two chrominance (Cb, Cr) matrices of 8-bit pixel data. Each of these matrices is divided into 8×8 blocks, and each block (after level shifting) is transformed by DCT into transform coefficients F(u, v) consisting of DC and AC coefficients. These DCT coefficients are quantized with a quantization table Q(u, v) ($\geq 1$) by taking the integer portion of the quotient F(u, v)/Q(u, v). In general, different quantization tables are used for luminance and chrominance coefficients (i.e., one quantization table for the luminance coefficients and one quantization table for the chrominance coefficients). The quantized DC coefficients are differentially encoded with DC Huffman tables, whereas the AC coefficients are zigzag scanned and then Huffman coded. In this embodiment, the typical Huffman tables (referred to as typical Huffman codes below) as given in appendix K of the JPEG specification are used.

JPEG Baseline coding allows the file size to be changed or controlled by varying the quantization tables. A simple and frequently employed method is scaling the quantization tables by varying a scale factor SF that multiplies the quantization tables $Q_0(u,v)$ in K.1 or K.2 of appendix K of the JPEG specification, which are henceforth referred to collectively as the default quantization tables, to define new, scaled quantization tables corresponding respectively to different picture qualities. That is, a new quantization table Q(u, v) is obtained by formula (1):

$$Q(u,v) = \max(INT(SF \times Q_0(u,v)), 1), \qquad (1)$$

where INT denotes the integer portion of a fractional number.

As can be seen from formula (1), the smaller the scale factor SF is, the finer the quantization. If SF=1/64, all quantization factors become one, and the file size of the JPEG image data becomes rather high, whereas if SF=1, the result is the default quantization tables $Q_0(u,v)$, and the file size lessens.

Figure 1:
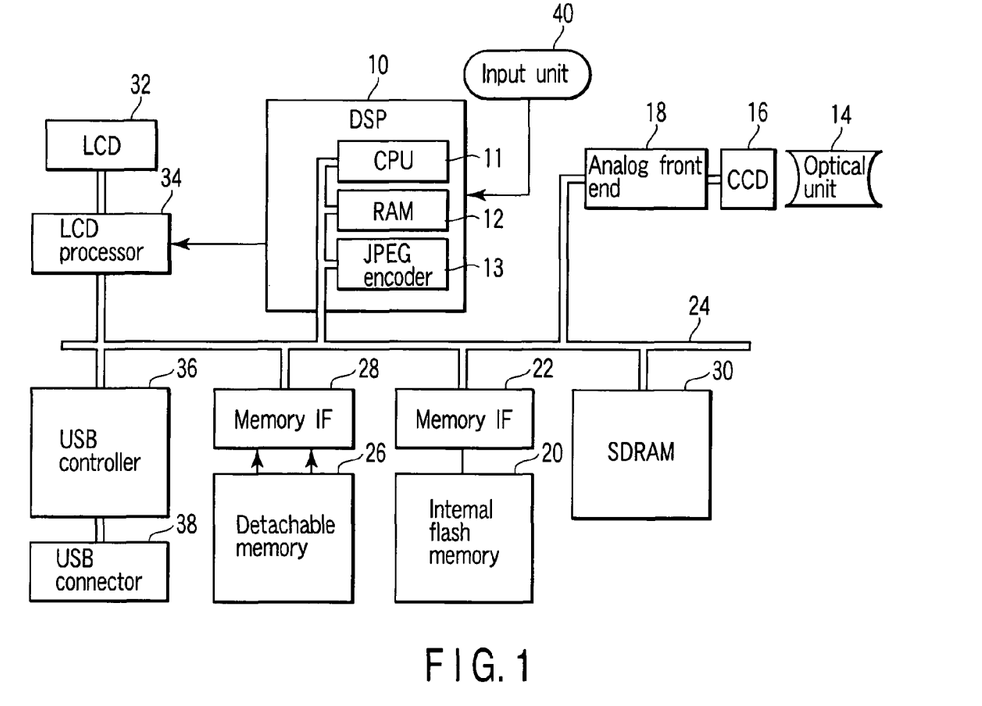
FIG. 1 is a schematic block diagram of a digital camera in which the method in accordance with the invention can be applied.

More concretely, as shown in FIG. 1, a digital camera 1 according to this embodiment includes a CCD 16 to capture an image obtained via an optical unit 14, which may include one or more lens units, which may be fixed or detachable. The captured image is sampled, converted to digital data (A/D converted) and pre-processed by an analog front end IC 18 to obtain digital image data. A digital signal processor (DSP) 10 converts the digital image data into Y-, Cb-, and Cr-component image data, which is temporarily stored in an internal SDRAM 30 and is read out from the SDRAM 30 in 8×8 blocks of pixels to be JPEG-encoded. As shown in FIG. 1, the DSP 10 is connected to various components, including the analog front end 18, the SDRAM 30, a memory interface (I/F) 22 for an internal flash memory 20, a memory I/F for an external (removable) memory 26, a USB controller 36 and an LCD processor 34 via a central data bus 24, and the DSP 10 controls the various components of the digital camera 1 via control buses. The DSP 10 includes a CPU 11, which can execute firmware routines loaded from the internal flash memory 20, which is accessed via the bus 24 and the memory interface (I/F) 22. In addition, the DSP 10 includes an internal RAM 12. The DSP 10 includes a JPEG encoder (explained below with respect to FIGS. 3 and 4) including hardware- and software-implemented components, and the DSP 10 performs JPEG encoding on the YCbCr digital image data. That is, the CPU 11 of the DSP 10 executes JPEG-firmware to serve as a software portion of the JPEG encoder, and the DSP 10 also includes hardware components 13 of the JPEG encoder. The JPEG-encoded digital image data is stored in the removable memory 26, which is coupled to the data bus 24 through the memory I/F 28. The removable memory 26 may be, for example, a removable flash memory card, such as an xD card, a CompactFlash card, or an SD card. The digital camera 1 also includes a display, such as an LCD 32, which is controlled by an LCD processor 34. Still further, a USB connector 38 is provided to connect the digital camera 1 to, for example, a host computer, and the USB connector 38 is coupled to the data bus 24 via a USB controller 36.

Moreover, the digital camera 1 includes an input unit 40 including, for example, buttons and/or switches, operable by a user of the digital camera to input instructions to the digital camera 1. For example, the user may operate the input unit 40 to: turn the digital camera 1 on and off; to instruct the digital camera to enter a photographing mode, in which, for example, in which, for example, images are captured via the CCD and displayed on the LCD 30 as an electronic viewfinder and in which images can be captured via the CCD, processed and stored in the removable memory 26; and to instruct the digital camera to enter a playback mode, in which stored images are played back.

In addition, the user may operate by the input unit 40 to select an image quality at which captured images are stored. That is, as explained above, JPEG baseline coding allows the file size to be changed by varying a scale factor SF that multiplies the quantization tables. For example, according to this embodiment of the present invention, the scale factor SF may be one of seven discrete values ranging from 1/64 to 1 in non-uniform steps, namely 1/64, 1/16, 1/8, 1/6, 1/4, 1/2 and 1. These scale factors indicate the compression ratio used in the JPEG encoding, and thus indirectly indicate the image quality. The scale factor 1/64 corresponds to a super-quality image; the scale factors in the range of 1/16 to 1/6 correspond to a high-quality image; and the scale factors in the range of 1/4 to 1 correspond to a normal quality image. By operating the input unit 40, the user may select a desired quality of image, and a scale factor is set in the DSP 10 to JPEG encode the image according to the desired image quality. If the user does not set a desired image quality, a default image quality corresponding to a scale factor of 1/8, for example, is set. Moreover, it is also possible to set the image quality based on a pre-photographing analysis of the complexity of the image (for example, a higher image quality may be necessary to preserve detail in a more complex image). The seven discrete possible scale factor values 1/64, 1/16, 1/8, 1/6, 1/4, 1/2 and 1 are sufficient for practical purposes in a digital still camera. Nevertheless, the number of scale factors is not limited to the seven discrete values 1/64, 1/16, 1/8, 1/6, 1/4, 1/2 and 1. For example, a greater or lesser number of discrete scale factor values may be used. Alternatively, as will be clear from the description below, it is possible to provide a continuous range of scale factor values (in contrast to the discrete possible scale factor values provided in the present embodiment).

When a user sets a desired image quality, the scale factor SF corresponding to the desired image quality is read out from the internal flash memory 20 and stored in the internal RAM 12 of the DSP 10, and a copy is stored in the SDRAM 30. More specifically, the SDRAM 30 stores, for example, information concerning which buttons of the input unit 40 have been pressed, a current scale factor, system data, and so on, which is read out from and written into the SDRAM 30 by the DSP 10 (the CPU) running firmware programs. The SDRAM 30 is also used by the DSP 10 for image processing, to store, for example, the YCbCr data, as mentioned above, and the JPEG file created by the JPEG processing.

Figure 2:
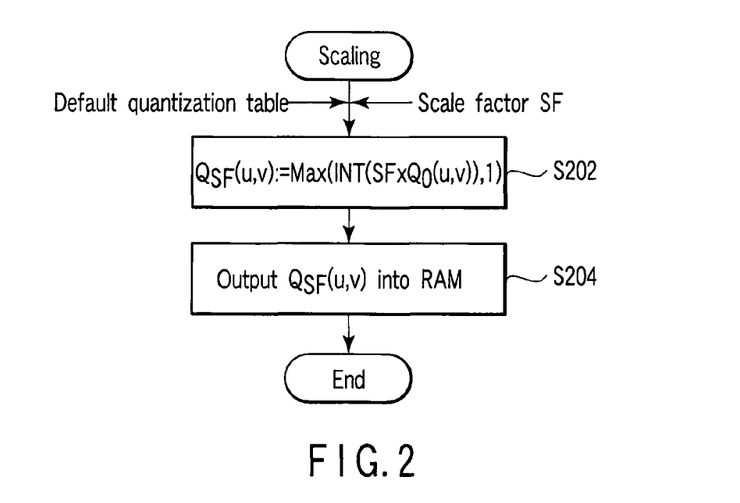
FIG. 2 is a flowchart illustrating the process of scaling a quantization table for JPEG encoding.

When an image is captured and before JPEG encoding is performed on the captured image at the set scale factor, the DSP refers to the set scale factor SF and executes a firmware routine read out from the internal flash memory 20, to generates a scaled quantization table Q(u, v) for each of the luminance and chrominance data based on the default quantization tables $Q_0(u, v)$ for the luminance and chrominance data by performing the scaling process shown in FIG. 2. That is, in the scaling process, the DSP 10 calculates Q(u, v) by formula (1) based on the set scale factor SF (stored in the internal RAM 20) and a default quantization table $Q_0(u, v)$ (which has been read out from its storage location in the internal flash memory 20) to obtain a quantization table scaled in accordance with the set scale factor SF (step S202). The scaled quantization table is output from the DSP 10 and temporarily stored in the internal RAM 12 of the DSP 10 (step S204). The scaling process is performed twice (consecutively): once to scale the luminance quantization table and once to scale the chrominance quantization table.

Figure 3:
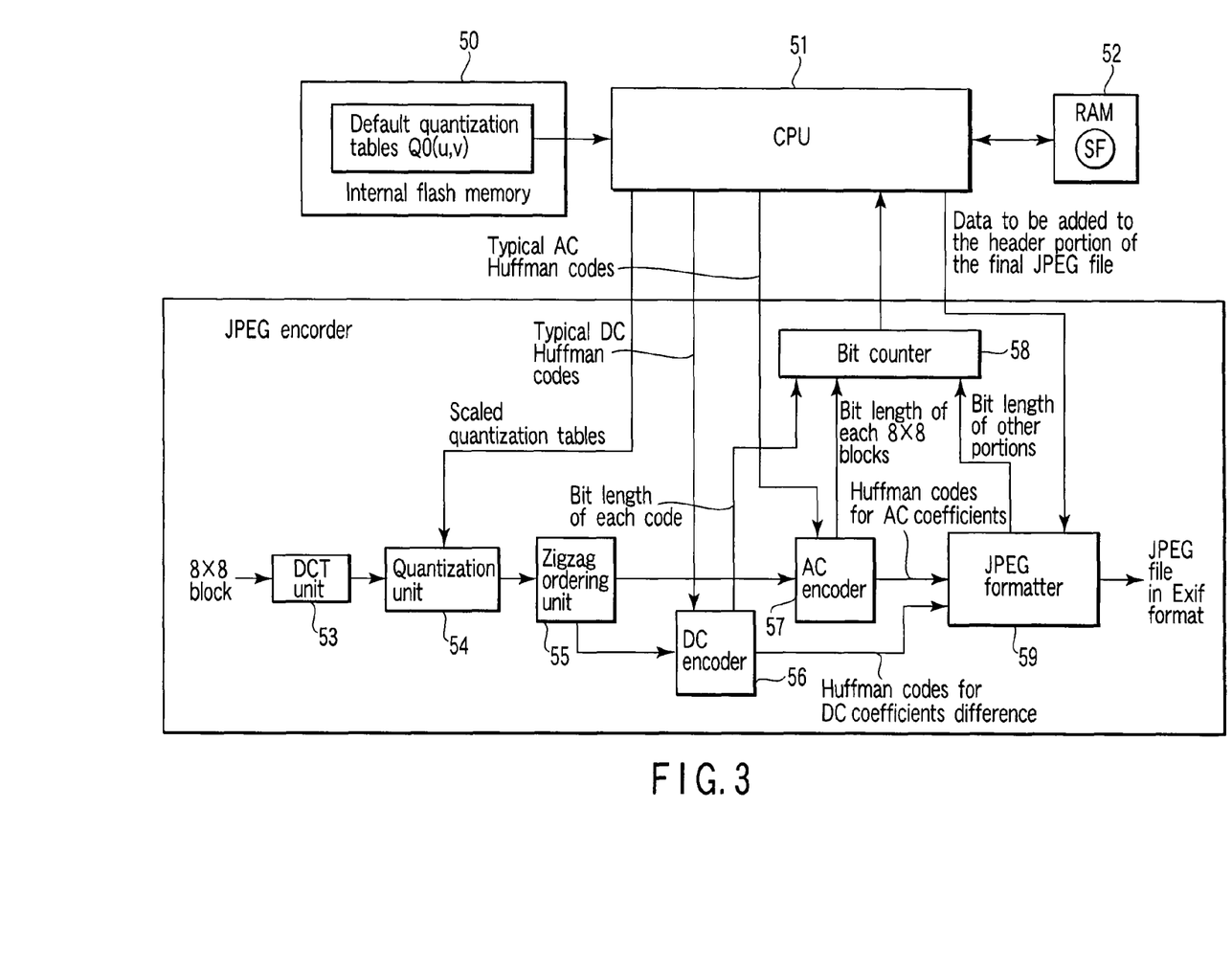
FIG. 3 is a schematic illustration showing JPEG encoding for processing a block of image data.
Figure 4:
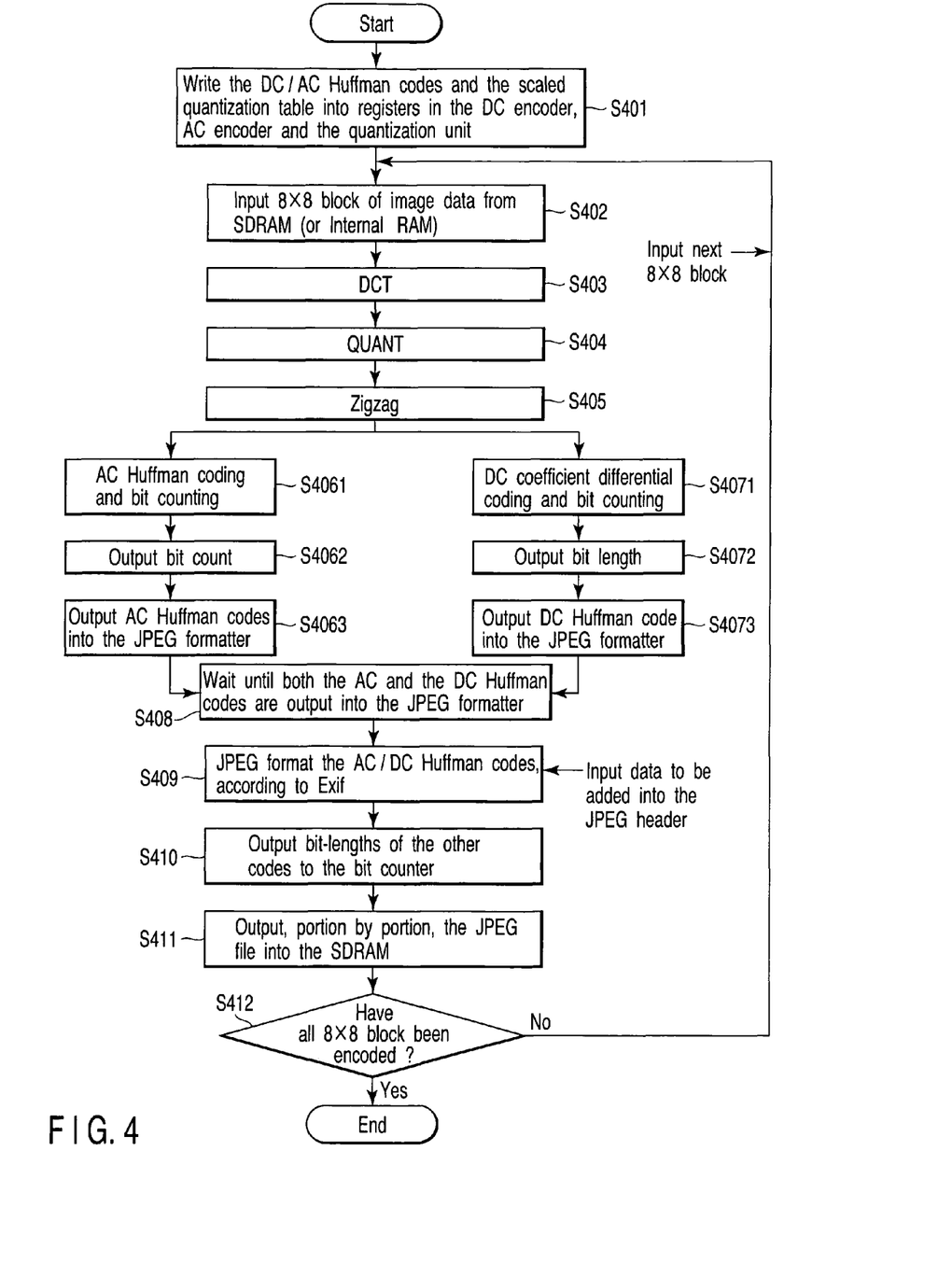
FIG. 4 is a flowchart illustrating JPEG encoding.

As noted above, the DSP 10 includes a JPEG encoder including hardware-implemented components 13 in FIG. 1 and software-implemented components, which are implemented by the CPU 11 executing firmware routines. FIG. 3 illustrates the structure of the JPEG encoder, and the flowchart of FIG. 4 illustrates the process of JPEG-encoding an image. Only the elements of the JPEG encoder that are relevant to the discussion of the present invention are illustrated, since there are numerous well-known JPEG encoders.

In FIG. 3, element 50 represents the internal flash memory 20, which stores the default quantization tables as well as typical Huffman codes for the AC and DC coefficients. Element 51 represents the CPU 11, which calculates the scaled quantization tables as explained above, with respect to FIG. 2. Moreover, element 52 represents the internal RAM 12, which stores the set scale factor, the scaled quantization tables, and other temporary values for use in JPEG encoding of an 8×8 block of pixels. Elements 53-59 represent the hardware-implemented components of the JPEG encoder, which are designated by reference numeral 13 in FIG. 1. In more detail, the JPEG encoder includes a DCT unit 53, a quantization unit 54, a zigzag ordering unit 55, a DC encoder 56, an AC encoder 57, a bit counter 58, and a JPEG formatter 59.

Before JPEG encoding an image, the CPU 51 reads the default quantization tables from the internal flash memory 50, scales the default quantization tables, and stores the scaled quantization tables in the internal RAM 52, as described above. The CPU 51 reads the scaled quantization tables from the RAM 52 and writes them into an internal register of the quantization unit 54. Then, the CPU 51 reads out the typical Huffman codes (for AC and DC coefficients, for luminance and chrominance, as required), and the CPU 51 writes the Huffman codes into the internal registers of the corresponding hardware blocks (that is, the DC encoder and the AC encoder) (step S401)

In the JPEG encoding, each of the Y, Cb and Cr matrices of the image data stored in the SDRAM 30 is divided into 8×8 blocks by the DSP 10, and the JPEG encoding is performed for each block in turn. More specifically, a given 8×8 block (of pixels) of image data is read out from the SDRAM 30 (or from the internal RAM 12) (step S402), and the DSP performs (after level shifting) DCT on the level-shifted 8×8 block using the DCT unit 53 (step S403). The DC and AC coefficients obtained by the DCT are quantized by the quantization unit 54 using the relevant (for luminance or chrominance data) scaled quantization table written into the internal register of the quantization unit 54 (step S404). The quantized coefficients are zigzag scanned by zigzag ordering unit 55 (step S405).

The AC coefficients, which have been ordered by the zigzag ordering unit 55, are outputted to the AC encoder 57 and are variable-length coded (AC Huffman coding), The AC encoder 57 has a built-in bit calculator which calculates the bit-length of the AC coefficients in the encoded 8×8 block by adding the length of each Huffman code and of the amplitude of each code together. (Step S4061) The AC encoder 57 outputs the bit count to the bit counter 58 (step S4062), and outputs the AC Huffman codes to the JPEG formatter 59 (step S4063).

The DC coefficient, on the other hand, is outputted to the DC encoder 56, which performs differential coding of the DC coefficient (step S4071). The DC encoder 56 outputs the bit-length of the DC Huffman code to the bit counter 58 (step S4072), and outputs the DC Huffman code to the JPEG formatter 59 (step S4073). The term DC Huffman code encompasses the Huffman code itself as well as the amplitude code.

At step S408, the DSP 10 waits until both the AC and DC Huffman codes have been outputted to the JPEG formatter 59, and at step S409 the DSP 10 checks whether AC and DC Huffman codes have been obtained for every 8×8 block of pixels in the image being encoded. If all of the 8×8 blocks have not been processed, the process returns to step S402, and steps S402 to S409 are repeated until AC and DC Huffman codes have been obtained for every 8×8 block of pixels have been obtained for every 8×8 block of pixels. The AC and DC Huffman codes are formatted in accordance with the EXIF format by the JPEG formatter 59 (step S409). The JPEG formatter 59 adds various other codes to the AC and DC codes in an order prescribed by the EXIF format. The added codes are inputted to the JPEG formatter 59 from the CPU 51 and include, for example, marker codes (e.g., Start of Image, or SOI), an RST (restart marker), the typical Huffman codes, the employed (scaled) quantization tables), the date of photography, the name of the camera device, and so on. The JPEG formatter 59 also counts bit-lengths of the added codes and outputs the bit-lengths to the bit counter 58 (step S410), and the JPEG formatter 59 outputs the formatted JPEG file portion by portion to the SDRAM (step S411). At step S412, the DSP 10 checks whether all of the 8×8 blocks making up the image being encoded have been encoded. If all of the blocks have not been encoded, the process returns to step S402, to process the next 8×8 block. On the other hand, when all of the blocks have been encoded and outputted to the SDRAM, the process ends. When the outputting of the JPEG file is completed, the JPEG file is transferred to the removable memory 26.

The bit counter 58 adds the received bit-lengths together and outputs the sum periodically to the CPU 51. If the CPU has been programmed to perform rate control, the CPU may monitor the sum of the bit-lengths to determine whether a target JPEG file length is likely to be exceeded. In conventional JPEG encoders, the bit counter 58 may be used to iteratively refine the scale factor, which is not performed according to the present invention. However, the bit counter 58 may be used in the alternative embodiment described below to perform a semi-iterative technique.

According to the present invention when the digital camera is turned on and is in the photographing mode, the DSP 10 performs a process to determine the number of JPEG encoded images that can be stored in the memory space remaining in the removable memory 26, based on a theoretical upper limit for the file size of the JPEG encoded images. The theoretical upper limit for the file size of the JPEG encoded images is dependent on a control parameter (of the file size), namely, the scale factor SF in this embodiment.

In more detail, as is clear from the foregoing, a JPEG image file includes the coded DC and AC coefficients, as well as the other JPEG file portion including, for example, the Huffman tables, the quantization tables, restart markers (RST), and a header portion with a thumbnail image, and so on. According to the present invention, the theoretical upper limit is determined as the sum of respective theoretical upper limits of the DC coefficient portion, the AC coefficient portion, and the other JPEG file portion.

Using the rules of the JFIF and Exif specifications, it is rather straightforward to predict an upper limit for the code-length of the file portion other than the DC and AC coefficients. Let h denote the theoretical upper limit function for the bit-length of this JPEG file portion. Although this portion contains the scaled quantization tables themselves, which depend on the scale factor SF, the variation in code-length at different scale factors is not large compared to variations of the AC coefficient code sections. Therefore, a predetermined upper limit value will be used for the quantization tables. Further, the thumbnail image itself is often encoded using JPEG. Although one could apply an upper limit function of this invention (see below) to the thumbnail image, prior art methods such as iterative file-size control (described above) work well to encode the thumbnail image into a given code-length frame, because the size of the thumbnail image is very small and does not require much calculation effort. Therefore, the upper limit h is taken to be fixed and independent of the scale factor SF.

As for the DC coefficient portion, since DC Huffman codes are assigned to each DC coefficient difference separately (thus, there is no concept of runlength-coding), a theoretical, maximum code-length d(SF) of the DC coefficient portion can be determined as a simple sum of the longest possible code-word for each such difference value. The maximum code-length depends on the scale factor because the DC values must be quantized using a scaled quantization table, which may limit the maximum DC amplitude. For example, if the scaled luminance DC quantization value is 16, then the maximum category of the DC coefficient difference becomes 7 rather than the maximum category 11, whereby that the Huffman code-length as well as the bit-size of the amplitude value lessens.

Finally, with respect to the AC coefficients, if the total number of luminance 8×8 blocks is n1 and the total number of chrominance 8×8 blocks is n2, and if l(SF) and c(SF) denote theoretical upper limits for the bit-length for one 8×8 block of luminance and chrominance AC coefficients, respectively, the theoretical upper limit for the AC coefficient code-length is given by $n1 \cdot l(SF) + n2 \cdot c(SF)$.

Thus, the theoretical upper limit f(SF) for the file-size of the JPEG file is given by:

$$f(SF) = h + d(SF) + n1 \cdot l(SF) + n2 \cdot c(SF). \quad (2)$$

In formula (2), as explained above, h is a predetermined value that is independent of scale factor SF, and which is stored in advance in the internal flash memory 20. Moreover, the maximum code length d(SF) is determined as a simple sum of the longest possible code-word for each difference value, which is dependent on the scale factor SF. Since, as explained above, in the present embodiment the scale factor SF may be one of seven discrete values ranging from 1/64 to 1 in non-uniform steps, namely 1/64, 1/16, 1/8, 1/6, 1/4, 1/2 and 1, there are only seven possible values for d(SF). Therefore, each of the seven possible values for d(SF) may be stored in advance in the internal flash memory 20. Still further, with respect to the term $n1 \cdot l(SF) + n2 \cdot c(SF)$, since in the present embodiment the scale factor SF may be one of seven discrete values ranging from 1/64 to 1 in non-uniform steps, namely 1/64, 1/16, 1/8, 1/6, 1/4, 1/2 and 1, the values for the functions l(SF) and c(SF) are determined as having the values indicated by Table 1 (the method of obtaining the values of Table 1 is described in more detail below). The theoretical upper limit f(SF) for the file-size of the JPEG file can there by be determined for each of the seven discrete scale factors.

TABLE 1

|  | Scale factor: SF | | | | | | |
| --- | --- | --- | --- | --- | --- | --- | --- |
|  | 1/64 | 1/16 | 1/8 | 1/6 | 1/4 | 1/2 | 1/1 |
| Luminance: l(SF) in bits | 1134 | 956 | 812 | 715 | 654 | 517 | 429 |
| Chrominance: c(SF) in bits | 1071 | 797 | 670 | 603 | 593 | 468 | 349 |

Thus, a theoretical upper limit file size, which is dependent on a control parameter (namely, the scale factor SF in this embodiment) can be determined for reach of the possible values for the control parameter (scale factor SF).

The values for each of d(SF), l(SF) and c(SF) may be predetermined and stored in the internal flash memory 20 for each of the seven possible scale factor values in the present embodiment. Additionally (or alternatively), the seven possible values of f(SF) may be stored for a given image size.

However, if a continuous or nearly continuous range of potential scale factor values is provided, storing a value for each of d(SF), l(SF) and c(SF) for each of the possible scale factor values may not be economical. In this case, instead of storing actual values, the internal flash memory 20 stores firmware routines that are executable by the CPU 11 of the DSP 10 to perform calculations to determine the values of d(SF), l(SF) and c(SF), and then to determine a value of f(SF) for any input scale factor value in a certain range of interest.

Moreover, such values for determining the upper limit file size (values of h, d(SF), l(SF) and c(SF)) and/or values for the upper limit f(SF) itself may be predetermined and stored in the internal flash memory 20 for particular types of images, such as medical images, astronomical images, graphical images, or other classes of images, which are encoded using Huffman codes different from the typical Huffman codes. Alternatively, these values for the particular types of images can be determined using firmware routines, if the number of possible values for the scale factor is large (for example, continuous, or nearly continuous, as noted above). For example, the digital camera 1 may be capable of taking different types of images in different modes (selectable by a user, or determined automatically based on an analysis of image content, for example). In this case, the upper limit value is determined based on the set mode and the set image quality. Alternatively, the digital camera 1 may be dedicated to a particular use, such as astronomy or medical imaging. In this case, the digital camera would only be intended to take images of only a particular type, and the upper limit values for the encoded image size would only need to be predetermined and stored beforehand in the internal flash memory 20 (or, alternatively, calculated by the CPU 11) for the particular type of image, without, for example, storing the upper limit values based on encoding with the typical Huffman codes. The method of calculating upper limit values according to the present invention for the typical Huffman codes and for other Huffman codes will become apparent to one of ordinary skill in the art based on the description of the calculation method below.

Given a remaining amount of memory space M, the remaining number N of images taken with some scale factor SF is calculated by the DSP 10 as the integer portion of the quotient of the memory space by the theoretical upper limit:

$$N=INT(M/f(SF)). \quad (3)$$

Figure 5:
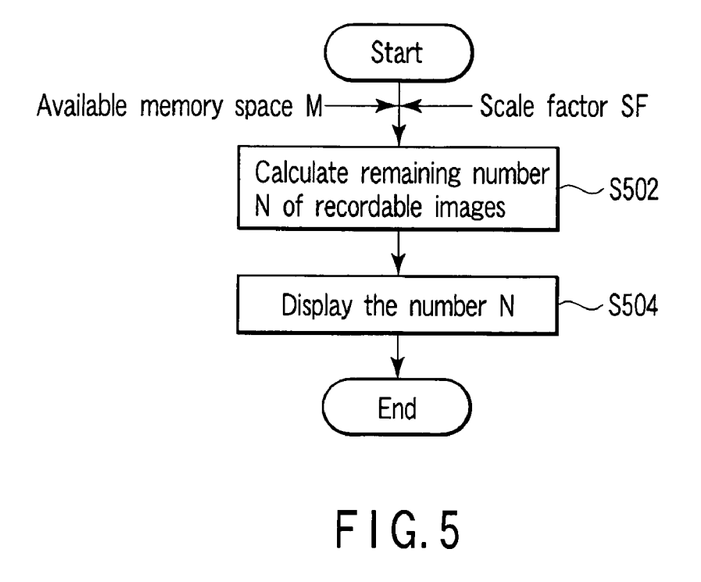
FIG. 5 is a flowchart illustrating calculating the number of images recordable in an available memory space.

When the digital camera is turned on and is in the photographing mode, the DSP 10 performs the process shown in FIG. 5 based on a firmware routine read from the internal flash memory 20 to determine the number of JPEG encoded images that can be stored in the memory space remaining in the removable memory 26. That is, given inputs of the available (remaining) memory space M and the set scale factor SF, the CPU 11 in the DSP 10 executes the calculation shown in formula 3 to determining the number of images N that can be stored at the set scale factor SF (step S502). The DSP 10 generates a signal corresponding to the number N, and stores a value of the number N in the internal RAM 12 and in the SDRAM 30. Moreover, the DSP 10 causes the number N to be output to a user by, for example, outputting a signal corresponding to the number N to the LCD processor 34, which controls the LCD 32 to display the number (step S504).

The DSP 10 determines the available memory space M and calculates the calculation of the number of images N that can be stored in the available memory space (executes the process of FIG. 5) each time the digital camera is caused to enter the photographing mode, and each time that there is a change in the content of the removable memory 26 while the digital camera is in the photographing mode, for example, each time that a new image is photographed, JPEG encoded, and stored in the removable memory 26.

Figure 6:
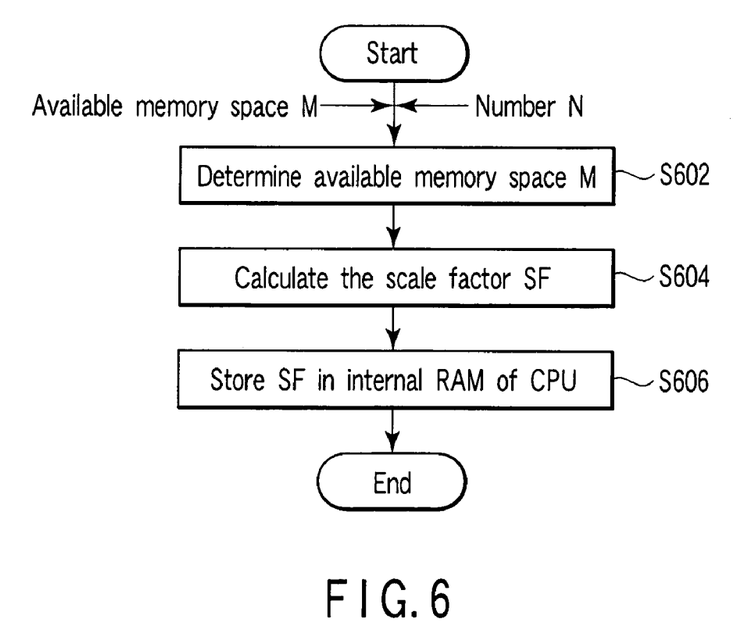
FIG. 6 is a flowchart illustrating calculating a scale factor to perform rate control encoded data in order to record a given number of items of the encoded data in a given memory space.

It is also possible, according to the present invention, to set the value of f(SF) in accordance with the available memory space M and a number of images that a user desires to take. That is, according to the present invention another photographing mode may be provided in which a user may operate the input unit 40 to designate a desired number of images to be stored in the remaining memory space. Accordingly, as shown in FIG. 6, which illustrates a process executed by the DSP 10 based on a firmware routine read from the internal flash memory 20, given a number of images N input by a user, the CPU 11 in the DSP 10 obtains the amount of available memory space M (step S602), and performs the calculation:

$$f(SF) \leq M/N. \quad (4)$$

And determines the scale factor SF for the value of f(SF) necessary to guarantee that the desired number of images N can be stored in the available memory M (step S604). In order to calculate the scale factor SF, or image quality, necessary to fit the N JPEG images in the available memory space M, the inequality in (4) is iteratively solved in step S602 until an appropriate value for f(SF), and hence SF, is found. In the present, preferred embodiment f(SF) is defined only for a finite number of discrete values of SF, so that simple comparison loops or a finite case selection algorithm suffices to choose the appropriate scale factor SF. This scale factor computation realizes a very simple rate control method, in which the encoded output data fits within a predetermined memory space with absolute certainty. The CPU 11 temporarily stores the obtained scale factor SF in the internal RAM 12 (step S606). The obtained scale factor SF is used in the calculation of the scaled quantization tables for JPEG encoding, as explained above with respect to FIGS. 2-4.

It should be understood that the determination of the theoretical upper limit value of the file size at a given scale factor performed according to formula (2) is not equivalent to a mere "brute force" determination of the upper limit of the file size. More specifically, in formula (2), the largest contribution comes from the two AC coefficient terms. A crude upper limit for the code-length of AC coefficients in an 8×8 block can be estimated (instead of using the functions l(SF) and c(SF)) as follows: the AC coefficient code-length can not exceed 63 times the maximum code-length of the Huffman codes in the JPEG specification, which is 16 bits, plus the maximum size, which is 10 bits. Thus a "brute force" upper limit (in bits) for the luminance AC coefficients as well as for the chrominance AC coefficients is given by $$u=63\times(16+10)=1638. \quad (5)$$

Compared with the values of the functions l(SF) and c(SF) (see Table 1), this limit is obviously too high. Furthermore, this number was derived with no reference to the quantization table, and therefore is completely independent of the scale factor. If this value u were used in place of l(SF) and c(SF) in deriving f(SF), the calculation methods (3) and (4) would become useless for practical purposes. Indeed, the uselessness of the crude upper limit is a significant reason why upper limits have not been applied to rate-control and related topics in consumer electronics area. By contrast, the method represented by formula (3) and (4) above can easily be implemented in a digital camera, and the present invention allows the selection of a plurality of image qualities and further enables a simple rate control mechanism (4).

The calculation method of the upper limit functions l(SF) and c(SF) for the AC coefficients within the framework of JPEG Baseline coding scheme is described in more detail below. As noted above, although the present, preferred embodiment makes use of a finite number (namely, seven) of possible values for the scale factor, it is possible to provide a continuous range of possible scale factor values. In the following, details that are easily verifiable by one of ordinary skill in the art of image coding have been omitted.

<Mathematical Background>

The set of all level-shifted image pixel data of an 8×8 block with values in the range $[-2^7, 2^7-1]$ of signed integers fills an off-centered cube $I=[-2^7, 2^7-1]^{64}$ in a 64-dimensional space. This cube is contained in a ball B around the coordinate origin with radius $R=2^7 \times \sqrt{64}=2^{10}$. Although the DCT is known in the literature as a 1-to-1 mapping from the image domain into the frequency domain, it is easy to check that the DCT, when viewed as a linear mapping within the 64-dimensional space, is an orthogonal transformation. Therefore, the ball B is mapped onto itself and the cube I is mapped into another rotated cube J within the ball B. Any matrix of DCT coefficients $F(u, v)$ lie in J. $F(u, v)$ is denoted simply by F and called a configuration and J is called the configuration space.

After quantization with the scaled quantization table in formula (1), the quantized AC coefficients $D(k)$, $k=1, \ldots, 63$, are ordered in a zigzag scanning order and are represented by runlength r, size s, and amplitude a. In the following, the scaled quantization table is also expressed in zigzag scanning order: $Q(k)=Q(u, v)$. Huffman codes Huff(r,s) as exemplified in appendix K of the JPEG specification, henceforth Typical Huffman codes, are assigned to each symbol (r,s), whereas each amplitude a is encoded with s bits. Let len( ... ) denote the length in bits of the final code for a given DCT configuration or for a sub-sequence AC coefficients. For a quantized AC coefficient $D(k)=a$ with size s preceded by r zeros, $\text{len}(0, 0, \ldots, 0, D(k))=\text{len}(r,s)=\text{len}(\text{Huff}(r,s))+s$. For a sequence of coefficients with sizes $s_1, s_2, \ldots, s_l$, the notation $\text{len}(s_1, s_2, \ldots, s_l)$ is used.

<Problem and Simplification>

In order to derive the upper limit functions l(SF) and c(SF), the mathematical problem of calculating an upper limit of the code-lengths for all configurations in j for a given scaled quantization table Q(k) must be solved. In order to solve this problem, the problem is simplified in several steps.

First, note that an upper limit of the code-length for any and all configurations in B is certainly also an upper limit of code-length for all configurations within the original configuration space J as a subset of B. Henceforth, J is replaced by B and all possible configurations in B are considered.

Second, note that in B, the maximum code-length for a given quantization table does not lessen if any one of the quantization table coefficients is replaced by a smaller coefficient. This can be shown by noting that if F is a configuration in B, then any configuration F' whose coefficient amplitudes are less than or equal to the corresponding ones in F will still lie in B. Given the scaled quantization table Q(k), the scaled quantization table Q(k) is replaced by a new quantization table $Q_2(k)$ defined by the largest integer power of 2 not exceeding Q(k), $Q_2(k):=2^{C(k)}$, (where $C(k)=[\log_2 Q(k)]$ ("power-of-2 quantization table"). The default quantization tables in appendix K of the JPEG specification fulfill the relation $Q_0(l)/Q_0(k)<2$ if l<k, which can be shown to imply the relation $C(l)-C(k) \leq 1$ if l<k for the selected range between 1 and 1/64 for the scale factor. Note that in this case, $0 \leq C(k) \leq 6$.

Third, if $F_{max}$ denotes a maximum code-length configuration in B for the power-of-2 quantization table C(k), $F_{max}$ is required here to be efficient, i.e., it is required that its coefficients be non-negative and chosen to be as small as possible without changing the AC coefficient code-length and staying fully within B. Thus, the DC coefficient is set to zero. AC coefficients can be assumed to be either zero or integer powers of 2, since if an AC coefficient is negative, it can be replaced by its absolute amplitude, and further since if a coefficient is not an integer power of 2, it can be replaced with the largest integer power of 2 not exceeding the coefficient without affecting the quantized value due to the power-of-2 feature of the quantization table. In particular, if an AC coefficient is zero after quantization, it can be set to zero already before quantization. In effect, $F_{max}$ can be assumed to lie in the discrete space $B_2$ of all configurations in B with a zero DC coefficient and in which each AC coefficients is either zero or a positive integer power of 2. The configuration space B can henceforth be restricted to $B_2$.

Any configuration F in $B_2$ can be characterized by the size $S(k)$, $k=1, \ldots, 63$, of the AC coefficients, where the size can be $1, \ldots, 10$ as before or 0, which is defined to represent a zero coefficient. Quantization of F amounts to reduce these sizes by the powers-of-2 $C(k)$ of the quantization factors, so that the quantized sizes are given by $s_k=\max(S(k)-C(k),0)$.

Thus, by the steps outlined above, the problem has been reduced to that of finding an upper limit of code-lengths for an efficient maximum code-length configuration in $B_2$ when using the power-of-2 quantization table $Q_2(k)$. This upper limit is automatically an upper limit of code-length for all DCT configurations for the given scale factor.

<Calculation Method>

Let $F_R$ be the reference configuration which has a zero DC coefficient and all AC coefficients of the same value $2^7$, i.e., $S_R(k)=8$, and which has quantized sizes $s_k=S_R(k)-C(k)=8-C(k) \geq 2$. For an arbitrary efficient configuration $\overline{F}$ in $B_2$ having sizes $\overline{S}(k)$ and quantized sizes $\overline{s}_k=\overline{S}(k)-C(k)$, operations MINUS and PLUS are defined which together transform $F_R$ into the target configuration $\overline{F}$. During the transformation, each position $p=1, \ldots, 63$ is traced in ascending zigzag scan order and operated by MINUS first, followed by PLUS:

MINUS: If $\overline{S}(p)$ is non-zero, smaller than 8, and preceded by r zeros, then replace $S_R(p-r), \ldots, S_R(p) \mapsto 0, \ldots, 0, \overline{S}(p)$.
If $\overline{S}(p)$ is greater than or equal to 8 and preceded by r>0 zeros, then replace $S_R(p-r), \ldots, S_R(p) \mapsto 0, \ldots, 0, S_R(p)$.
If $\overline{S}(p)$ is non-zero and all subsequent $\overline{S}(q)=0$ (q>p), then replace $S_R(q) \mapsto 0$ for all such q>p.

PLUS: If $\overline{S}(p)$ is greater than 8 and not preceded by zeros, then replace $S_R(p) \mapsto \overline{S}(p)$. If $\overline{S}(p)$ is greater than 8 and preceded by r>0 zeros, then, after being operated by MINUS, replace $S_R(p) \mapsto \overline{S}(p)$.

Let δ be the local code-length difference, which is defined to be the change in code-length per affected position for these operations: if an operation replaces m quantized sizes $t_i$ at positions $p_i$ by $\bar{t}_i$, but leaves n quantized sizes $u_j$ unaffected, then it is given by $\delta=\delta(t_i,u_j)=(\text{len}(t_i,u_j)-\text{len}(\bar{t}_i,u_j))/m$. The code-length difference δ is assigned to each of the m affected positions $p_i$. These m positions together yield the total change in code-length through the operation. By carefully studying the lengths of the Typical Huffman codes, it can be shown that the MINUS always induces non-positive local code-length differences, whereas the PLUS operation induces non-negative ones. Let $-\delta_M<0$ denote the local code-length difference induced by MINUS operation, wherein the index M runs over the positions p, sizes, runlengths, and any cases that must be distinguished. Let $\alpha_q>0$ be the local code-length gain induced by PLUS for $\bar{s}_q=s_q+1$, and similarly let $\beta_q>0$ be the local code-length gain for $\bar{s}_q=s_q+2$.

Now let $\overline{F}=F_{max}$ be an efficient maximum code-length configuration in $B_2$. The code-length of $F_{max}$ can be represented as a sum of the code-length of $F_R$ and the local code-length differences for each position affected by the operations MINUS and PLUS defined to transform $F_R$ into $F_{max}$. By using obvious notations for the indices, we have $\text{len}(F_{max}) = \text{len}(F_R) + A + B - \Delta$, wherein the sum $A = \Sigma_q \alpha_q$ counts the local code-length gains induced by the PLUS operation for unquantized size 9, $B = \Sigma_q \beta_q$ counts those for unquantized size 10, and the non-negative sum $\Delta = \Sigma_M \delta_M$ has contributions from the MINUS operation.

Let a and b be the numbers of the terms in A and B, respectively, i.e. of those positions having unquantized sizes 9 and 10, respectively. Let $S_{max}(k)$ be the unquantized sizes of $F_{max}$. Let $p_i$, $i = 1, 2, \ldots, a$, and $q_j$, $j = 1, 2, \ldots, b$, be positions in $F_{max}$ with $S_{max}(p_i) = 9$ and $S_{max}(q_j) = 10$, respectively. Since $F_{max}$ lies in the ball B of radius $2^{10}$, its coefficients satisfy $$\sum_{S_{max}(k) > 0} 2^{2S_{max}(k) - 2} < 2^{20},$$

which is equivalent to $$\sum_{S_{max}(k) > 0, k \neq p_i, q_j} 2^{2S_{max}(k) - 2} < (64 - 4a - 16b) \cdot 2^{14}.$$

This gives the constraint $a + 4b < 16$, which restricts the number of category 9 and 10 positions to 40 combinations of the pair (a,b). In particular, $0 \leq a \leq 15$ and $0 \leq b \leq 3$. Further, since the left hand side sums over at most $63 - a - b$ positions, at least $3a + 15b$ positions must have unquantized coefficients with size less than 8. Thus there are at least $3a + 15b$ positions associated with the local code-length losses in $\Delta$. Since these local code-length losses have been generated by the MINUS operations for the particular configuration $F_{max}$, the total sum $\Delta$ of these losses is certainly not smaller than the sum of only the first $3a + 15b$ smallest local code-length losses for any and all possible MINUS operations for any and all target configurations $\overline{F}$. More precisely, let $\Delta\{\ \}$ be the set of all local code-length losses $\delta_M$ for any and all MINUS operations defined for any and all possible target configurations. If we define the function $\Delta(n)$ to be the sum of first n smallest values in $\Delta\{\ \}$, then $\Delta \geq \Delta(3a + 15b)$.

In a similar fashion, let $A\{\ \}$ be the set of all local code-length gains $\alpha_q$ for any and all possible target configurations $\overline{F}$, and likewise, let $B\{\ \}$ be the set of all local code-length gains $\beta_q$ for any and all possible target configurations. Define the function $A(n)$ to be the sum of first n largest values in $A\{\ \}$, and the function $B(m)$ to be the sum of first m largest values in $B\{\ \}$. Then, $A \leq A(a)$ and $B \leq B(b)$. Thus, the inequality $\text{len}(F_{max}) \leq \text{len}(F_R) + A(a) + B(b) - \Delta(3a + 15b)$ is obtained. The terms other than $\text{len}(F_R)$ on its right-hand side are certainly not greater than the maximum of the same expression $A(a) + B(b) - \Delta(3a + 15b)$ for all 40 possible combinations (a,b), so that $$\text{len}(F_{max}) \leq \Lambda,$$

where $$\Lambda = \text{len}(F_R) + \max_{(a,b)} \{A(a) + B(b) - \Delta(3a + 15b)\}.$$

This is the desired upper limit of the code-length for any configuration in $B_2$ when using the power-of-2 quantization table $Q_2(k)$, which has been shown to be an upper limit for all DCT configurations when using the given scaled quantization table. By employing heuristic arguments, the derived upper limit $\Lambda$ can be improved to a slightly lower upper limit $\overline{\Lambda}$.

The above calculation method can be applied to the luminance and chrominance AC coefficients to yield the upper limits in Table 1.

The calculation method described above can be applied to quantization tables which are not scaled versions of the default quantization tables, as should be clear to one of ordinary skill in the art. Moreover, as mentioned above, any Huffman code tables may be employed; that is, the present invention is not limited to the typical Huffman codes. For example, the JPEG specification does not restrict the Huffman codes to be the typical Huffman codes (from appendix K of the JPEG specification), but rather, near-optimum Huffman codes adapted for special classes of images, such as medical images (of human tissues), graphical images, or astronomical images (which include a few white spots for the stars and a dark, or nearly dark, remainder), may be used. For each of such classes, specific Huffman codes may be determined beforehand and stored in the internal flash memory. Using the calculation method described above, for each of these different Huffman codes, one may determine the upper limit values for the JPEG file sizes and store these values in the internal flash memory.

In this preferred embodiment described above, only the one scale factor SF for both luminance and chrominance coefficients is used as a single control parameter in order to simplify the description. Moreover, the embodiment described above uses only discrete values of the scale factor SF. However, in an alternative embodiment, more than one such control parameter may be defined to enable finer control of the file size. For example, one may take different scale factors SF1 and SF2 for the luminance and the chrominance quantization tables, respectively, a further, discrete control parameter assigned to different sets of Huffman tables could be applied. Still further, only one image pixel size (e.g., SXGA) is considered for this embodiment to simplify the illustration. However, it is understood that the invention is applicable even if a plurality of image pixel sizes, e.g. VGA, SXGA, or even other aspect ratios are present, since, as is clear from the description above, the calculation of the upper limit builds upon individual calculations for the DC and AC coefficients, which can be applied to any image pixel size or aspect ratio as long as the JPEG file format is the same.

The calculation of the number of images N that can be stored in the remaining memory space M is not limited to equation (3) set forth above. For example, let a(SF) be the average JPEG file size for the given image pixel size and a given scale factor and let σ(SF) be the variation in the file size according to an assumed statistical model such as the Gaussian or Laplace distribution. Such statistical data can be obtained by taking a large number of sample pictures. This statistical data may depend on the picture taking device, e.g. the type of the camera used.

Instead of deriving N as in equation (3), one can define:

$$N = INT((M - f(SF))/a(SF)) + 1, \quad (6)$$

giving the inequality $(N-1) \cdot a(SF) + f(SF) \leq M$. Thus, the number of images that can be stored in the available memory space is calculated based on the average JPEG file size, except for last image, which is calculated based on the theoretical upper limit function. In this way the user is able to store the last JPEG file into the memory with high probability. This feature is very advantageous for digital cameras, since the user does not want to miss the last chance to capture an image before the media card of the camera is full.

In order to ensure this feature with even higher probability, the variation should be taken into account for the derivation of N. In more detail, instead of assuming that individual images (except for the last image) have the average file size a(SF), the 3sigma(SF) variation may be taken into account. For example, assuming a Gaussian distribution of the file size, the standard deviation is given by sigma(SF) and the average by a(SF). Assuming statistically independent images, the average size of N'=N−1 pictures is given by N' times a(SF), whereas the variation grows only by the square root of N', so that the standard deviation is now given by SQRT(N') times sigma(SF). The square root growth of the deviation is the same for a 3sigma variation. Thus, by adding to the average size of N' images the 3sigma variation for N' statistically independent pictures, a formula that can be used to derive N is:

$$(N-1)\cdot a(SF) + \sqrt{N-1}\cdot(3\sigma(SF)) + f(SF) \leq M. \quad (7)$$

If the number N is selected to satisfy this inequality (e.g. iteratively or explicitly solving this inequality which is easily possible for those skilled in the art), there is almost absolute certainty that the last JPEG file can be stored into the memory space M. The factor of 3 before the variation term $\sigma(SF)$ ensures 3-sigma certainty. The square root of N−1 before the variation reflects the assumption that the variation is of purely statistical nature and that two successively stored JPEG images have no statistical relation with each other. On the other hand, if repetitive shooting in a digital camera is considered, then there is usually high statistical correlation between successive images, so that one should linearly add the variation, $$(N-1)\cdot(a(SF) + 3\sigma(SF)) + f(SF) \leq M, \quad (8)$$

from which one obtains the formula $$N = INT((M - f(SF))/(a(SF) + 3\sigma(SF))) + 1. \quad (9)$$

Thus, formulas (7) and (8) can be solved to give an N-value (e.g. formula (9) for formula (8) or by iterative calculation methods for formula (7)) instead of using formula (3), and the resulting N-value can be displayed to the user. The new N-value(s) is larger than that of (3) and is closer to an average situation of photographing, since the average values are used. i.e. the displayed new N-value is closer to what the user can actually store in the available memory space. One disadvantage is that there may occur situations where the actually stored images are less in number than the predicted and displayed new N-values. In this context, note that the N-value (according to any one of formulas (3), (7), or (8)) is calculated whenever the content of the memory card is changed, in particular whenever a new image has just been stored in the memory card. Thus, depending on the updated amount of available memory space, these formulae might give the same number N as one image before instead of decreasing by 1. When formula (3) is used, such a situation occurs more often than when using the alternative formulas, since usually the file size will be around the average file size and seldom comes close to the upper limit.

Figure 7:
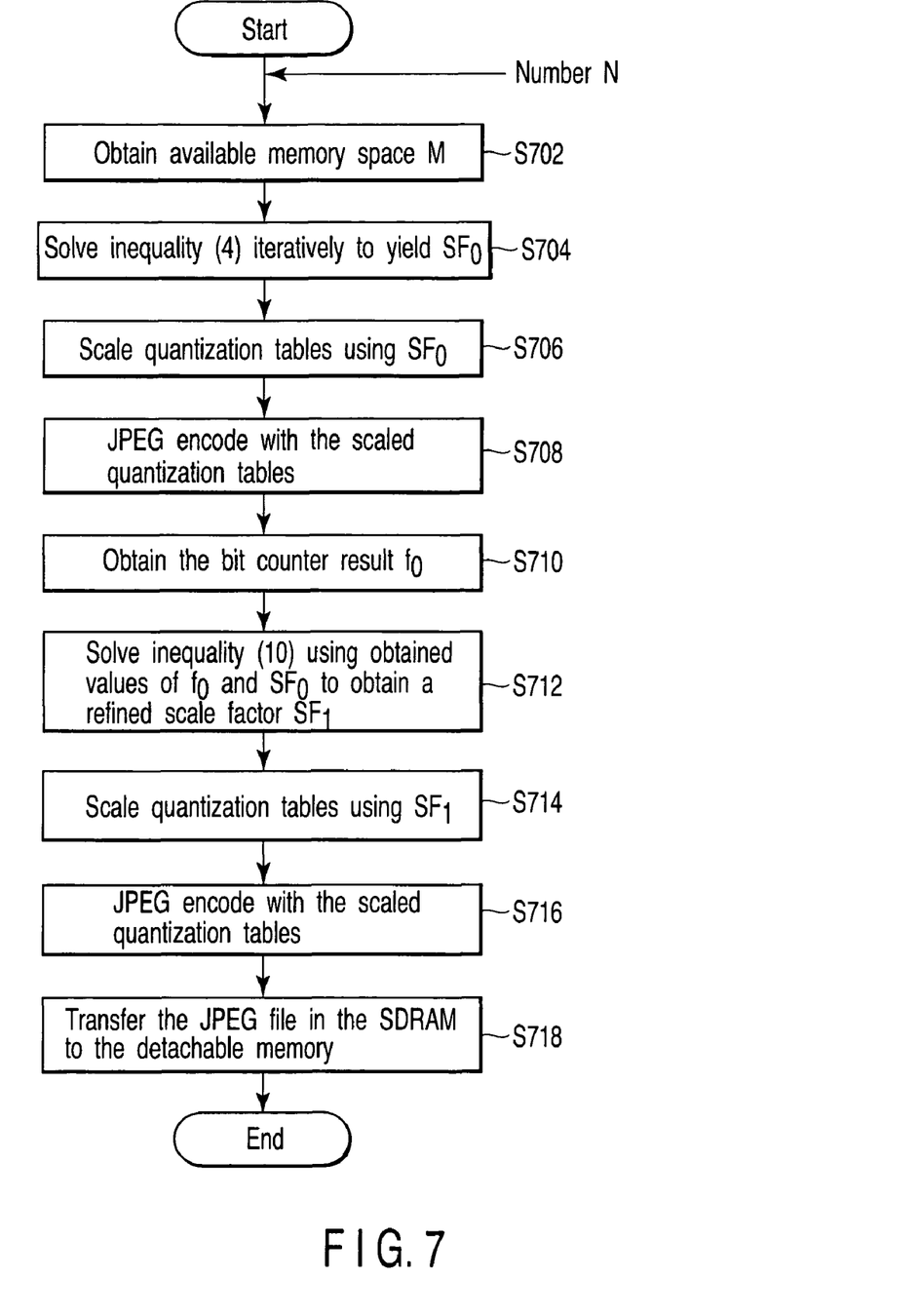
FIG. 7 is a flowchart illustrating a semi-iterative rate-control method according to the present invention.

Moreover, according to the present invention, inequality (4) can be used to define a semi-iterative (only one repetition) rate-control method, as shown in FIG. 7, which illustrates a process executed by the CPU 11 executing a firmware routine read from the internal flash memory 20. Given a prescribed number N of to-be-taken JPEG image files input by a user, the CPU 11 determines the amount of available memory space M (step S702), and solves inequality (4) by employing a small iterative program or the like to obtain the smallest scale factor value $SF_0$, which will result in the largest file size possible (step S704). As long as such computation does not involve the JPEG encoder or a bit-counting mechanism, the processing time is negligibly small for this computation. The scale factor $SF_0$ is stored in the internal RAM 12 and is used to scale the quantization tables as explained above with respect to FIG. 2 (step S706) and to JPEG encode input image data as explained above with respect to FIG. 4 (step S708). The encoded data is however not output (step S212 of FIG. 4 is not performed), but rather only its code-length $f_0$ is counted by the bit counter 58 and saved temporarily in the RAM 12 (step S710). The JPEG file size $f_0$ obtained in this manner yields in most cases a value smaller than $f(SF_0)$. By employing the functional relation a(SF) between the scale factor and the average JPEG file size, the smallest scale factor $SF_1$ is selected in such a way that the inequality $$f_0/a(SF_0)\cdot a(SF_1) \leq f(SF_0) \quad (10)$$

is still satisfied (step S712). This new scale factor $SF_1$ is then applied to scale the quantization tables using the process explained above with respect to FIG. 2 (step S714) and to encode the same input image data for a second time using the process explained above with respect to FIG. 4 (step S716) to yield the final JPEG file (in this second encoding, the data is outputted from the JPEG formatter to the SDRAM; that is, step S212 of FIG. 4 is performed). From statistical behavior, it can be expected that the final size, $f_1$, will behave with respect to $f_0$ like the average $a(SF_1)$ does with respect to $a(SF_0)$, so that $$f_1 \approx f_0/a(SF_0)\cdot a(SF_1) \leq f(SF_0) \quad (11)$$

is still satisfied with a high degree of probability. This semi-iterative rate control method is advantageous against prior art rate control methods, since it only requires one iteration instead of possibly many. The semi-iterative rate-control of the present invention can be easily implemented as firmware executed by the CPU 11, and can be used, for example, to obtain almost constant file size instead of keeping the file size just below a targeted value.

The present invention can be easily applied to motion picture coding schemes like MPEG4 or H.264, which are described in detail in "H.264 and MPEG-4 Video Compression" by Iain E. G. Richardson, John Wiley & Sons Ltd., 2003, which is incorporated herein by reference. The I-VOP and the P-VOP in the MPEG4 video coding scheme both apply the DCT, quantization, zigzag scanning, and variable-length coding. In particular, the quantizer scale parameter QP can be changed in the range from 1 to 31 to control the code-length of 8×8 blocks in I-VOP.

The method of calculating the upper limit function according to the present invention can be applied here, with QP being the control parameter. Thus, in order to keep the code-length of the I-VOP below a prescribed bit-length $M_0$ that is set in the apparatus that performs the MPEG encoding and read out (determined) by a CPU of the apparatus, the bit-lengths the $N_0$ 8×8 blocks in the I-VOP are controlled. By employing an upper code-length limit function g(QP) of the 8×8 block codes in dependence on the QP, according to the present invention the smallest quantizer scale parameter $QP_0$ satisfying the inequality:

$$g(QP_0) \leq M_0/N_0 \quad (12)$$

is determined by a CPU executing a firmware routine in the apparatus that performs the MPEG encoding (e.g., a video camera). By quantizing the blocks with this quantizer scale parameter, the total I-VOP bit-length becomes certainly below $M_0$. This description has been simplified by dispensing with a discussion of code portions other than those from the 8×8 blocks in the I-VOP, but those skilled in the art will recognize from this description how individual code-lengths of I-VOP or P-VOP in MPEG4 encoding can be controlled using the present invention even if some overhead is present.

Since the 8×8 blocks in MPEG4 are encoded using the same scheme as in the JPEG Baseline coding, i.e. DCT, quantization, zigzag scanning, and variable-length coding, the mathematical derivation of the function g(QP) is performed along the same lines as the calculation of the upper limit functions l(SF) and c(SF) as explained in detail above.

This control method for the MPEG4 is in fact a non-iterative rate-control method. A video camera generates video frames (I-VOP or P-VOP, for example) with a fixed frame rate of 30 fps (frame per second), for example. Controlling the individual bit-lengths below $M_0$ bits amounts to controlling the bit-rate of the video stream below $30M_0$ bps (bits per second).

Figure 8:
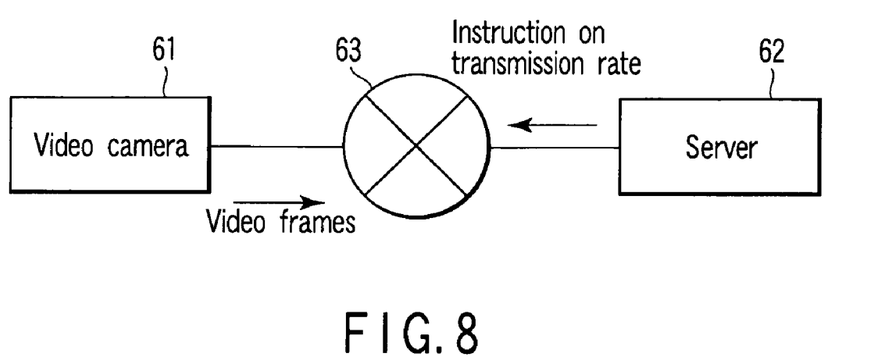
FIG. 8 is a flowchart illustrating a network in which rate-control of a video transmission is performed according to one aspect of the present invention.

The method of the present invention can be implemented in a networked environment, as shown in FIG. 8. For example, a video camera 61 that produces MPEG4 video (encoded moving image data) using a known encoder can be controlled from a server 62 over a communication network 63, such as the Internet, to continuously and in real time transmit MPEG4 video images from a transmission section of the video camera 61 at 30 fps to the server via the Internet in a well-known manner. Depending on the communication traffic on the network, the server can instruct the network video camera to change the image quality by using the rate-control algorithm of the present invention by transmitting an instruction via the Internet 63 to the video camera 61 from a transmission section of the server 62. For example, if communication traffic is high, it may be desirable to reduce the transmission rate from the video camera over the network. That is, the server transmits instructions regarding the transmission rate to the video camera 61 via the network 63. For example, the server instructs the network video camera to keep the transmission rate below z (bps). The video camera calculates (by a CPU thereof executing a firmware routine) the maximum allowed code-length $M_0$ for individual frames by the equation $M_0=z/30$ (in unit of bits per frame). The video camera 61 then performs the rate-control method described above with respect to inequality (12) to control the bit-rate to be below the instructed transmission rate by controlling the total I-VOP bit-length to be below the value of $M_0$ corresponding to the instructed transmission rate.

The rate-control method of the present invention need not be applied to every frame of a movie or Motion JPEG file. Rather, it is advantageous to apply it only for a restricted number of frames. For example, it may be applied to every 15th frame within the Motion JPEG movie with a 30 frames per second frame-rate.

The present invention is not restricted to Huffman or Exp-Golomb entropy coding, and is also applicable to context-based adaptive variable length coding (CAVLC), arithmetic coding, and other variable length coding schemes.

Moreover, the present invention is not restricted to Discrete Cosine Transform, but applies for any other transformations like wavelet transformations and lapped orthogonal transformations. Indeed, the present invention does not require a transform coding to be present at all. The factors important for application of the present are the control parameter(s) and variable length coding.

What is claimed is:

1. A method for an apparatus which encodes items of data by variable-length coding and which stores the encoded items of data in a memory, wherein a size of one of the items of encoded data is variable by varying a value of a control parameter of the variable-length coding, the method comprising:
   determining an amount of available memory space in the memory;
   determining a value of the control parameter for the variable-length coding of the items of data; and
   determining a number of items of encoded data that can be stored in the available memory space, based on an upper limit of the size of one of the items of encoded data at the determined value of the control parameter, said upper limit varying with the value of the control parameter.

2. The method of claim 1, wherein the determining of the number of items of encoded data that can be stored in the available memory space comprises determining a ratio of the amount of the available memory space to the upper limit of the size of one of the items of encoded data at the determined value of the control parameter.

3. The method of claim 2, wherein the number of items of encoded data that can be stored in the available memory space is an integer that is not greater than the ratio of the amount of the available memory space to the upper limit of the size of one of the items of encoded data at the determined value of the control parameter.

4. The method according to claim 1, wherein the upper limit of the size of one of the items of encoded data is a function of the control parameter.

5. The method according to claim 4, wherein the apparatus is adapted to determine the control parameter to be one of a plurality of discrete values, and wherein the upper limit of the size of one of the items of encoded data is stored beforehand for each of the plurality of discrete values of the control parameter.

6. The method of claim 1, further comprising outputting to a user the number of items of encoded data that can be stored in the available memory space.

7. The method of claim 5, wherein the outputting to the user comprises displaying the number of items on a display of the apparatus.

8. The method of claim 1, wherein the encoding of the items of data is JPEG encoding of items of image data.

9. The method of claim 8, wherein the control parameter is a scale factor that scales quantization tables used to quantize DC and AC coefficients resulting from discrete cosine transform in the JPEG encoding.

10. The method of claim 9, wherein the upper limit of the size of one of the items of encoded data is a function of the control parameter.

11. An apparatus which encodes items of data by variable-length coding and which stores the encoded items of data in a memory, wherein a size of one of the items of encoded data is variable by varying a value of a control parameter of the variable-length coding, the apparatus comprising:
   means for determining an amount of available memory space in the memory;
   means for determining a value of the control parameter for the variable-length coding of the items of data; and
   means for determining a number of items of encoded data that can be stored in the available memory space, based on an upper limit of the size of one of the items of encoded data at the determined value of the control parameter, said upper limit varying with the value of the control parameter.

12. An apparatus which encodes items of data by variable-length coding and which stores the encoded items of data in a memory, wherein a size of one of the items of encoded data is variable by varying a value of a control parameter of the variable-length coding, the apparatus including a hardware control unit comprising:
- a memory space determining section which determines an amount of available memory space in the memory;
- a control parameter determining section which determines a value of the control parameter for the variable-length coding of the items of data; and
- a determining section which determines a number of items of encoded data that can be stored in the available memory space, based on an upper limit of the size of one of the items of encoded data at the determined value of the control parameter, said upper limit varying with the value of the control parameter.

13. A method for an apparatus which encodes items of data by variable-length coding and which stores the encoded items of data in a memory, wherein a size of one of the items of encoded data is variable by varying a value of a control parameter of the variable-length coding, the method comprising:
- determining an amount of available memory space in the memory;
- determining a number of items of data to be stored in the available memory space; and
- determining a value of the control parameter, based on an upper limit of the size of one of the items of encoded data at the determined value of the control parameter, to set an encoded size of the each of the items of data to be stored in the available memory space,
- wherein said upper limit varies with the value of the control parameter.

14. The method according to claim 13, further comprising:
- encoding each of the items of data to have the adjusted size after encoding; and
- storing the items of encoded data in the memory.

15. The method according to claim 13, wherein the upper limit of the size of one of the items of encoded data is a function of the control parameter.

16. The method according to claim 15, wherein the apparatus is adapted to determine the control parameter to be one of a plurality of discrete values, and wherein the upper limit of the size of one of the items of encoded data is stored beforehand for each of the plurality of discrete values of the control parameter.

17. A method for an apparatus which encodes moving image data, which comprises a plurality of frames, each of which comprises a plurality of units, wherein the apparatus encodes each of the units by variable-length coding to encode the frames of moving image data, wherein a size of one of the units of encoded data is variable by varying a value of a control parameter of the variable-length coding, the method comprising:
- determining a maximum bit length of one of the frames after encoding; and
- determining a value of the control parameter, based on an upper limit of the size of one of the units of data after encoding at the determined value of the control parameter, such that the bit length of the one of the frames after encoding does not exceed the maximum bit length,
- wherein said upper limit varies with the value of the control parameter.

18. The method according to claim 17, wherein the apparatus transmits the encoded moving image data to a server via a network.

19. The method according to claim 18, further comprising supplying an instruction indicating a maximum transmission rate of the encoded moving image data from the server to the apparatus via the network;
- wherein said maximum bit length of one of the frames after encoding is determined based on the maximum transmission rate.

20. A system comprising:
- an apparatus which encodes moving image data, which comprises a plurality of frames, each of which comprises a plurality of units, wherein the apparatus encodes each of the units by variable-length coding to encode the frames of moving image data, and wherein a size of one of the units of encoded data is variable by varying a value of a control parameter of the variable-length coding;
- a network; and
- a server which communicates with the apparatus via the network, and which supplies an instruction indicating a maximum transmission rate of the encoded moving image data from the server to the apparatus via the network;
- wherein the apparatus comprises:
    - a maximum bit length determining section which determines a maximum bit length of one of the frames after encoding based on the maximum transmission rate; and
    - a control parameter determining section which determines a value of the control parameter, based on an upper limit of the size of one of the units of data after encoding at the determined value of the control parameter, such that the bit length of the one of the frames after encoding does not exceed the maximum bit length,
    - wherein said upper limit varies with the value of the control parameter.

* * * * *